(No Model.)
A. L. HALLBAUER.
CLAMP OR HOLDER.
No. 344,651. Patented June 29, 1886.
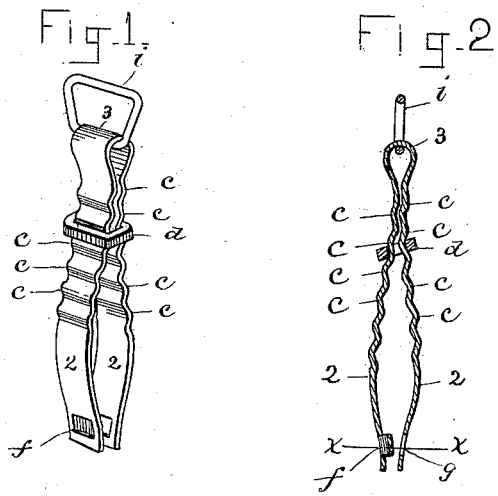
WITNESSES:
INVENTOR:

UNITED STATES PATENT OFFICE.

ALBERT L. HALLBAUER, OF LYNN, MASSACHUSETTS.

CLAMP OR HOLDER.

SPECIFICATION forming part of Letters Patent No. 344,651, dated June 29, 1886.

Application filed February 1, 1886. Serial No. 190,460. (No model.)

*To all whom it may concern:*

Be it known that I, ALBERT L. HALLBAUER, of Lynn, in the county of Essex and State of Massachusetts, have invented certain new and useful Improvements in Clamps or Holders, of which the following is a specification.

This invention has for its object to provide a clamp for temporarily securing together two or more layers or thicknesses of cloth or other like material, the invention being designed particularly for holding hoods or covers on the uppers of button boots, to prevent such uppers and their linings from being soiled during the various operations employed in finishing the boot.

The invention consists in a clamp composed of a strip of metal bent to form two legs, and a neck connecting said legs, and a rigid or inelastic ring or band inclosing said legs and adapted to slide thereon, said legs being formed to diverge from each other for a part of their length, and provided with a series of waves or corrugations, whereby the ring or band may be held at various points on the legs, and thereby caused to adjust the holding ends of the legs to the thickness of the superposed layers to be held by the device, as I will now proceed to describe.

Of the accompanying drawings, forming a part of this specification, Figure 1 represents a perspective view of my improved clamp. Fig. 2 represents a longitudinal section of the same. Fig. 3 represents a section on line *x x*, Fig. 2.

The same letters of reference indicate the same parts in all the figures.

In carrying out my invention I bend a strip of sheet metal into a clip composed of two legs, 2 2, and a connecting-neck, 3. Said legs are formed to diverge from each other from the neck partly to their outer ends, as shown, and said diverging portions are bent or made wavy, to form corrugations *c c* on both the outer and inner surfaces, each leg having a series of corrugations.

*d* represents an inelastic or unyielding ring or band formed to inclose the legs 2 2 and to slide thereon. Said band is placed on the corrugated portions of the legs, as shown, and is engaged by the corrugations *c c*, so that it cannot slip loosely, but will be held by the corrugations at any point to which it may be moved.

The corrugations formed by bending the legs of the clamp may be made of any desired depth without weakening the legs, no cutting being performed in making said corrugations. Grooves of sufficient depth to firmly retain the ring *d* are thus easily and cheaply formed. The corrugations in one leg are arranged to fit into the corrugations of the other leg, as shown, so that the legs can lie close together at the point where they are held by the band *d*. The device is thus made more compact than it would be if the corrugations did not fit each other. It will be seen that by moving the band *d* downwardly or toward the clamping ends of the clip said ends will be forced toward each other, while by moving the band toward the neck the clamping ends of the clip will be allowed to separate. The clip can therefore be readily adapted to the aggregate thickness of the layers to be held, and when adjusted is not liable to accidentally release its hold, the band being prevented from slipping by the deep corrugations formed as above described.

The clamping ends of the clip may have any desired form suited to the nature of the material or materials held. I prefer to indent one of said clamping ends to form an inwardly-projecting boss, *f*, which is entirely severed from the said end along its upper and lower edges to form sharp grasping-jaws, and cut a slot, *g*, in the other clamping end, as shown in Fig. 2, the boss coinciding with the slot, thus giving the clamping ends a better holding effect than if they were smooth.

This device may be used for garment-supporting purposes, or as a clothes-pin, or for any other desired purpose.

In case the device is used as a stocking or other garment supporter a ring or loop, *i*, may be placed in the neck 3, as shown in Fig. 1, to be secured to a supporting-strap.

I claim—

1. In a clip or clamping device, the single piece of metal bent to form the legs 2 2 and neck 3, said legs having the diverging portions, which are bent and made wavy or corrugated, as shown, the corrugations of one leg being arranged to fit into those of the other, combined with the inelastic ring or band adapted to slide on said diverging corrugated portions, as set forth.

2. The bent metal clip having the wavy or corrugated portions formed as shown, the sliding pressure-adjusting band, the boss $f$, struck up from one leg of the clip and entirely severed therefrom at its upper and lower edges to form sharp grasping-jaws extending crosswise of said leg, and the slot $g$ in the other leg, coinciding with the boss $f$, as set forth.

In testimony whereof I have signed my name to this specification, in the presence of two subscribing witnesses, this 27th day of January, 1886.

ALBERT L. HALLBAUER.

Witnesses:
C. F. BROWN,
ARTHUR W. CROSSLEY.